(12) United States Patent  (10) Patent No.: US 11,551,436 B2
Gu  (45) Date of Patent: Jan. 10, 2023

(54) METHOD AND PROCESSING UNIT FOR COMPUTER-IMPLEMENTED ANALYSIS OF A CLASSIFICATION MODEL

(71) Applicant: Siemens Aktiengesellschaft, Munich (DE)

(72) Inventor: Jindong Gu, Munich (DE)

(73) Assignee: SIEMENS AKTIENGESELLSCHAFT

( * ) Notice: Subject to any disclaimer, the term of this patent is extended or adjusted under 35 U.S.C. 154(b) by 459 days.

(21) Appl. No.: 16/847,072

(22) Filed: Apr. 13, 2020

(65) Prior Publication Data

US 2020/0334489 A1 Oct. 22, 2020

(30) Foreign Application Priority Data

Apr. 17, 2019 (EP) ...................................... 19169735

(51) Int. Cl.
*G06K 9/62* (2022.01)
*G06V 10/46* (2022.01)
(Continued)

(52) U.S. Cl.
CPC ............ *G06V 10/464* (2022.01); *G06F 16/55* (2019.01); *G06F 16/5854* (2019.01);
(Continued)

(58) Field of Classification Search
CPC .... G06V 10/464; G06V 10/462; G06F 16/55; G06F 16/5854; G06K 9/6262;
(Continued)

(56) References Cited

U.S. PATENT DOCUMENTS 10,497,025 B1\* 12/2019 Wai .................... G06Q 30/0269
2015/0016699 A1\* 1/2015 Ritt ....................... G06K 9/6227
382/128

(Continued)

OTHER PUBLICATIONS

Jindong Gu et al: "Understanding Individual Decisions of CNNs via Contrastive Backpropagation", arxiv.org, Cornell University Library, 201 Olin Library Cornell University Ithaca, NY 14853, XP080989558, Abstract; figures 1,3,5; 1. Introduction; 3. Rethinking Layer-Wise Relevance Propagation; 4. Contrastive Layer-Wise Relevance Propagation; 5. Experiments and Analysis; 2018.

(Continued)

*Primary Examiner* — Charlotte M Baker
(74) *Attorney, Agent, or Firm* — Schmeiser, Olsen & Watts LLP

(57) ABSTRACT

Provided is a method and processing unit for computer-implemented analysis of a classification model which is adapted to map, as a prediction, a number of input instances, each of them having a number n of features, into a number of probabilities of output classes, as a classification decision, according to a predetermined function, and which is adapted to determine a relevance value for each feature resulting in a saliency map. The disclosure includes the step of identifying an effect of each feature on the prediction of the instance by determining, for each feature, a relevance information representing a contextual information for all features of the instance omitting the considered feature. Then, the relevance value for each feature is determined. Finally, the plurality of relevance values for the features of the instance is evaluated to identify the effect of each feature on the prediction of the instance.

11 Claims, 3 Drawing Sheets

(51) Int. Cl.
　　　*G06F 16/55*　　　(2019.01)
　　　*G06F 16/583*　　(2019.01)
　　　*G06N 3/04*　　　(2006.01)
　　　*G06N 3/08*　　　(2006.01)

(52) U.S. Cl.
　　　CPC ........... *G06K 9/628* (2013.01); *G06K 9/6262* (2013.01); *G06N 3/0472* (2013.01); *G06N 3/08* (2013.01)

(58) Field of Classification Search
　　　CPC .... G06K 9/628; G06K 9/6268; G06N 3/0472; G06N 3/08; G06N 5/045; G06N 7/005; G06N 3/0454
　　　USPC .................................................. 382/156, 128
　　　See application file for complete search history.

(56) References Cited

U.S. PATENT DOCUMENTS

2017/0308770 A1*　10/2017　Jetley ..................... G06V 10/82
2018/0018553 A1*　1/2018　Bach ........................ G06N 3/02

OTHER PUBLICATIONS

Lang, K. Newsweeder: Learning to filter netnews. In Machine Learning Proceedings 1995, pp. 331-339. Elsevier 1995.
European Extended Search Report dated Oct. 18, 2019 for Application No. 19169735.8.

* cited by examiner

FIG 2

| FIG 2A | FIG 2B |

FIG 2A

R1 → [Loads of horrendous MZ engine problems deleted] Yeah, buy a four-stroke — D1

R2 →
GTC: rec.motorcycles
PC: rec.motorcycles
PD: 0.7909
SD: low

R3 →
SA: *of*, engine, buy, *deleted*, stroke
LIME: engine, stroke, horrendous, mz, buy
PDA: stroke, engine, horrendous, buy, mz
CPDA: stroke, engine, mz, horrendous, buy Does anyone belong to or know any facts about the Christian Reformed Church? — D2

GTC: soc.religion.christian
PC: soc.religion.christian
PD: 0.7866
SD: low

SA: *the*, *to*, church, *or*, *about*
LIME: church, christian, belong, facts, *about*
PDA: anyone, *any*, facts, belong, *to*
CPDA: church, christian, reformed, belong, facts

My ENT doctor told me that it is not uncommon for the wife to get a vaginal yeast infection after the husband takes antibiotics. ...

GTC: sci.med
PC: sci.med
PD: 0.9976
SD: high

SA: *the, to, is, and, it*
LIME: antibiotics, yeast, infection, vaginal, *ent*
PDA: *in*, vaginal, antibiotics, infection, ceclor
CPDA: yeast, antibiotics, infection, doctor, vaginal

D4 ya know that kind of funny cause I've seen Kariya on Campus with a Sharks hat on .... Pat Ellis P.S. GO BRUINS GO UMAINE BLACK BEARS 42-1-2 NUMBER 1 ... HOCKEY EAST REGULARS SEASON CHAMPIONS ... HOCKEY EAST TOURNAMENT CHAMPIONS> ... PAUS KARIYA HOBEY BAKER AWARD WINNER ... NCAA DIV.

GTC: rec.sport.hockey
PC: rec.sport.hockey
PD: 0.9999
SD: very high

SA: *out, that,* hockey, *on,* season
LIME: tournament, hockey, bruins, kariya, sharks
PDA: *42,* seen, *div, ncaa, baker*
CPDA: bruins, hockey, sharks, kariya, tournament

US 11,551,436 B2

METHOD AND PROCESSING UNIT FOR COMPUTER-IMPLEMENTED ANALYSIS OF A CLASSIFICATION MODEL

CROSS-REFERENCE TO RELATED APPLICATIONS

This application claims priority to European Application No. 19169735.8, having a filing date of Apr. 17, 2019, the entire contents of which are hereby incorporated by reference.

FIELD OF TECHNOLOGY

The following relates to a method for computer-implemented analysis of a classification model which is adapted to map, as a prediction, a number of input instances, each of them having a number of features, into a number of probabilities of output classes, as a classification decision, according to a predetermined function. Furthermore, the classification model is adapted to determine a relevance value for each feature resulting in a saliency map.

BACKGROUND

One of the weaknesses of machine learning models is the lack of interpretability. In particular, it is difficult to explain intelligent decisions to end users in practice. Models are often applied as black boxes, especially, deep neural networks. Deep models achieve human-level performance of many tasks, such as image classification and detection. These neural networks with deep architecture are even difficult to understand for machine learning experts. However, intelligent decisions need to explain to gain user trust.

In recent years, many model-aware saliency methods have been proposed to understand the relationship between the input and the output of deep neural networks. Saliency methods are algorithms identifying relevant features to individual classification decisions by creating so-called saliency maps. However, the existing model-aware saliency methods are not applicable to models with complex structures. Additionally, saliency maps are not reliable as some of them are independent of both the model and the data generating process.

Compared with model-aware methods, the model-agnostic methods seem to be an alternative analysis tool since they can work without accessing their parameters, architecture and gradients of outputs with respect to inputs. They are able to explain any classifiers, their produced explanations from two or more different types of models are comparable and so-called ensemble models can also be explained without requiring knowledge of model components.

Among others, LIME (Local Interpretable Model-agnostic Explanations) and PDA (Prediction Difference Analysis) seem to be the most promising methods for analyzing a black-box classification model.

LIME trains a local interpretable classifier to approximate the behavior of the original complex model on a single instance. The classification of the instance is explained with the trained interpretable classifier. Different interpretable classifiers give different explanations and the optimization of the same type of classifier could end with different parameters. Hence, the produced explanations are not consistent. Furthermore, for each classification, LIME is required to train a new classifier, which is inefficient.

An occlusion method identifies the relevance of each feature by occluding the features using pre-defined values. The occlusion with pre-defined values cannot remove deep evidence of the occluded features without introducing unexpected features.

To overcome these shortcomings, PDA, as a probabilistic sound methodology, was proposed to analyze individual classification decisions. PDA observes the changes of outputs when removing part of features of the instance. If an output score is decreased, the removed features are relevant, otherwise they are negative evidence. The removal of effect is implemented by replacing with different values and taking the average of their output score. However, for each feature, it requires many time classifications. It is infeasible when the dimensions of input are very high, such as when analyzing images. In addition, when many features of the classified instance support the classifications, this method does not work well.

SUMMARY

An aspect relates to an improved method for computer-implemented analysis of a classification model. It is still a further aspect of embodiments of the present invention to provide a processing unit which is adapted to provide an improved computer-implemented analysis of a classification model.

Embodiments of invention suggests a method for computer-implemented analysis of a classification model. The classification model is adapted to map, as a prediction, a number of input instances, each of them having a number of features, into a number of probabilities of output classes, as a classification decision, according to a predetermined function. Furthermore, the classification model is adapted to determine a relevance value for each feature resulting in a saliency map. The method comprises the step of identifying an effect of each feature on the prediction of the instance by determining, for each feature, a relevance information representing a contextual information for all features of the instance omitting the considered feature (i.e. except the considered feature). The method comprises the step of determining the relevance value for each feature by combining the relevance information for the features of the instance. Furthermore, the method comprises the step of evaluating the plurality of relevance values for the features of the instance to identify the effect of each feature on the prediction of the instance.

By taking the classification of contextual features into consideration, it is possible to efficiently identify the relevance of features without modeling or sampling processes. Hence, an efficient, consistent and model-agnostic explanation method is provided. In particular, the suggested method is able to explain a saturated classification where the output of an assessed classification model is close to 1. The suggested method is efficient. It takes seconds to produce an explanation for high-dimensional inputs, for example an image classification. In addition, the relevance of contextual features instead of a single feature is identified. The provided method only requires the output of the model, given an input instance. Hence, for black-box classifier models, an explanation can be generated only using their inputs and outputs. Such black-box models can be complex models, searched by AutoML or inaccessible remote models. e.g. APIs as offered by Google.

According to an embodiment, the relevance value for each feature is calculated by the sum of the ratios of the relevant information and the absolute value of the relevance information with this feature being the omitted considered feature.

According to a further embodiment, the relevance value for each feature is equal to or larger than 0.

According to a further embodiment, the relevance information is determined by calculating $$R_{/i} = f(x) - \Sigma_{k=1}^{M} p(v_k|k_i) p(y|x_i, v_k) = f(x) - f(x_i),$$

with $v_k$ being the sampled values conditional on $x_i$, $x_i$ being the feature i of the instance x, M being the number of samples of classes considered and y being an output class. In this formula $p(y|x_i, v_k)$ means the output probability of the output class y given the $x_i$ and the contextual features $v_k$. $f(x) = p(y|x)$ by default.

According to a further embodiment, when analyzing a classification model of high-dimensional images on deep neural networks, image patches instead of pixels are used as individual features. Hence, the method suggested can be applied to high-dimensional data, for example images, thereby enabling an efficient analysis.

It is an aspect that the shape of the image patches is squared. This makes the computation of $f(x_i)$ possible.

According to a further embodiment, instead of splitting the image into separated image patches, a patch is slid over the whole image with a fixed stride. This considers that not all pixels in an image patch are equally important. While too big patches lead to low-resolution saliency maps, too small patches are not visually understandable. To avoid this dilemma, instead of splitting the image into separated patches, sliding a patch over the whole image with a fixed stride like in convolutional operations is suggested.

According to a further embodiment, the classification model is a model-agnostic method.

Embodiments of invention further relates to a computer program product (non-transitory computer readable storage medium having instructions, which when executed by a processor, perform actions), directly loadable into the internal memory of a digital computer, comprising software code portions for performing the steps of the method as set out herein when the product is run on a computer. The computer program product may be in the form of a storage medium, like a USB-memory stick, a CD, a DVD, an EEPROM memory and so on. Alternatively, the computer program product may be in the form of a signal which is transmittable via a wireless or a wired line.

According to a further aspect, a processing unit for computer-implemented analysis of a classification model is suggested. The classification model is adapted to map, as a prediction, a number of input instances, each of them having a number of features, into a number of probabilities of output classes, as a classification decision, according to a predetermined function. The classification model is further adapted to determine a relevance value for each feature resulting in a saliency map. The processing unit is adapted to identify an effect of each feature on the prediction on the instance by determining, for each feature, a relevance information representing a contextual information for all features of the instance omitting the considered feature; determine the relevance value for each feature by combining the relevance information for the features of the instance, and evaluate the plurality of relevance values for the features of the instance to identify the effect of each feature on the prediction of the instance.

The processing unit according to embodiments of the invention has the same advantages as set out in conjunction with the method described above.

According to a further embodiment, the processing unit is further adapted to carry out the steps of the method described herein.

BRIEF DESCRIPTION

Some of the embodiments will be described in detail, with references to the following Figures, wherein like designations denote like members, wherein:

FIG. 2a shows a table illustrating explanations produced by different approaches for text classifications of a naive Bayes classifier;

FIG. 2b shows a table illustrating explanations produced by different approaches for text classifications of a naive Bayes classifier.

DETAILED DESCRIPTION

Figure 1:
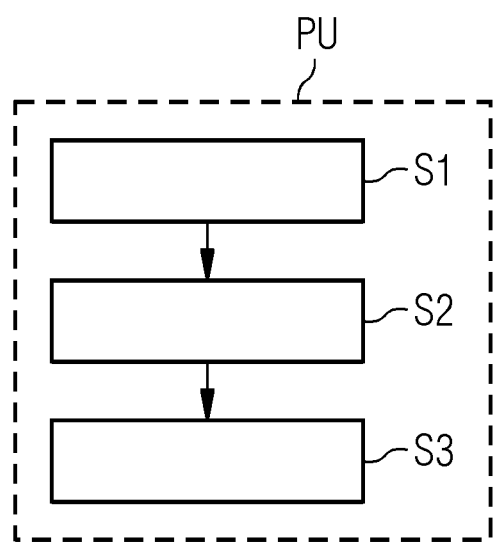
FIG. 1 shows a program sequence according to an embodiment of the present invention.

A deep neural network is a function mapping input features into a target space. Individual classification decisions of the deep neural network can be explained by way of saliency methods by creating saliency maps. Saliency maps produced by existing methods are however, not reliable. The two main model-agnostic explanation methods are LIME and PDA.

LIME trains a small classifier with interpretable weights (e.g., linear classifier) to approximate a local decision boundary of deep classifier. For each classification decision, this approach requires to train a new classifier, which is inefficient. Given a single classification, the optimization of a classifier could end with different parameters, which leads to inconsistent explanations. When explaining a classification using different classifiers, LIME produces different explanations.

PDA is another model-agnostic method to analyze classifiers. PDA is a probabilistic sound methodology and identifies the relevance of input features by marginalizing the effect of this feature and computing their prediction difference. PDA faces many challenges when it is applied to high-dimensional data. It requires many forward inferences, which is very slow. To reduce the times of inferences, it can analyze an image in super-pixel level. Beside this, PDA suffers from another problem that the method does not work well when many features of the classified instance support classifications which is called saturated classification.

In the following, PDA will be explained in more detail as PDA will form the basis for the suggested improved method for computer-implemented analysis of a classification model.

Generally, a classifier is a function mapping input instances into probabilities of output classes $f: x \to f(x)$. Each instance has n features $x = \{x_1, x_2, \ldots, x_n\}$. Given a classification decision $f(x)$ of the instance x, saliency methods assign a relevance value $r_i$ to each feature $x_i$. The resulted saliency map is defined as $R = \{r_1, r_2, \ldots, r_n\}$. To identify the effect, a feature $x_i$ has on the prediction of the instance x, PDA computes the difference between the two predictions:

$$r_i = D(f(x), f(x_{/i})), \tag{1}$$

where $f(x_{/i})$ means the model's prediction without the knowledge of the feature $x_i$ (marginal prediction) and $D(\,)$ is a function measuring the difference between two predictions. Two different ways may be used to evaluate such difference. The first is based on information theory. For a given class y, this measure computes the difference of the amount of information necessary to find out that y is true for the given instance x.

$$r_i = \log_2 p(y|x) - \log_2 p(y|x_{/i}) [\text{bit}]. \tag{2}$$

The second one directly computes the difference between two probabilities as follows:

$$r_i = p(y|x) - p(y|x_{\backslash i}). \qquad (3)$$

In the following, the difference is evaluated using a second measure. The first term p(y|x) can be obtained by just classifying the instance x with the classifier to be explained. The second term is computed by setting the feature $x_i$ unknown, which is allowed only in a few classifiers, e.g. naive Bayesian classifier. Another way to remove the effect of the feature $x_i$ is to retrain the classifier with the feature left out. Such retraining procedure is not feasible when the input instance is high-dimensional, such as is the case with images. A practical approach to simulate the absence of a feature is to marginalize the feature:

$$p(y|x_{\backslash i}) = \Sigma_{k=1}^M p(v_k|x_{\backslash i})p(y|x_{\backslash i}, v_k), \qquad (4)$$

where $v_k$ is a sampled value for the feature variable $x_i$. The conditional probability $p(x_j|x_{\backslash i})$ can be approximated with the prior probability $p(x_j)$ and considers a single input variable one feature.

As will be shown below, PDA suffers from classifier saturation. Given an instance $x=\{x_1, x_2, x_3\}$ and a classifier specifying its probability of belonging to a class c: $p(c|x)=\max(x_1, x_2, x_3)$ where $x_i \in [0,1]$, individual classification decisions are made by the classifier using PDA. A concrete instance $x=\{1,1,0\}$ is classified as $p(c|x)=\max(1,1,0)=1$. Following PDA, the relevance values of the three input features are as follows:

$$r_i = p(c|x) - p(c|x_{\backslash i}) = 0, i \in \{1,2,3\}. \qquad (5)$$

The analysis result means that the relevance values of all the features are zeros, which is on the contrary to the fact that the features $\{x_1, x_2\}$ support the classification decision.

The saturation phenomenon exists widely in the existing state-of-the-art classifiers. In image classification, many visual features could contribute to a single classification decision at the same time. For instance, in an image, two zebras support that the image belongs to the class "Zebra". When analyzing the classification decision on a series of state-of-the-art classifiers using prediction difference, different parts of the image are removed.

Table 1 shows the prediction differences of the respective samples, which is the relevance value of the removed visual feature. All the classifiers are confident to classify the original images as a zebra. In an image img_1, the head of one zebra is removed and the rest of the visual features is classified. The confidence of all classifiers hardly decreases, which means these classification decisions are saturated. Similarly, if the head of the other zebra in image img_2 is removed, all the classifiers also show high confidence as in the original image img_0. The removal of part of the background does not decrease the classification score (img_3). PDA assigns the difference as the relevance of the removed visual features to the classification decision. It is observed that PDA does not work in this case.

TABLE 1 classification scores of different images

| Image | img_0 | img_1 | img_2 | img_3 |
|---|---|---|---|---|
| AlexNet | .9999 | .9999(+.0000) | .9999(+.0000) | .9999(+.0000) |
| VGG16 | .9998 | .9995(−.0003) | .9997(−.0001) | .9997(−.0001) |
| Inception_V3 | .9415 | .9365(−0.050) | .9587(+.0172) | .9336(−.0079) |
| ResNet | .9945 | .9983(+.0038) | .9986(+.0041) | .9964(+.0019) |
| DenseNet | .9817 | .9920(+.0103) | .9712(−.0105) | .9803(−.0012) |

The suggested method for computer-implemented analysis of a classification model can be called a contextual prediction difference analysis (CPDA). This method is able to overcome the shortcomings presented above. When a feature $x_i$ is removed from the original instance x, the low prediction difference means the feature $x_i$ is not relevant according to the equation (3) of PDA, namely, $r_i = f(x) - f(x_{\backslash i}) \approx 0$.

According to the method of embodiments of the invention, instead of handling the single feature $x_i$ directly, the relevance of the contextual information is computed, i.e. the rest of the features or the single feature $x_i$ is omitted.

$$R_{\backslash i} = f(x) - \Sigma_{k=1}^M p(v_k|x_i)p(y|x_i, v_l) = f(x) - f(x_i), \qquad (6)$$

where $R_{\backslash i}$ are the reference values of all the features except $x_i$, and $v_k$ are the sampled values conditional on $x_i$. $R_{\backslash i}$ can be distributed to individual features in many different ways. For simplification, the equal distribution is taken:

$$r_j = \frac{R_{\backslash i}}{|R_{\backslash i}|}, j \neq i. \qquad (7)$$

An alternative formulation to identify the relevance of the individual attribute is $r_i = f(x_i)$, which computes the effect of a single feature. However, this formulation cannot identify negative evidence since $r_i = f(x_i) \geq 0$. The order of identified relevance values is equivalent to the one when marginalizing all the rest of features.

Using the demo instance $x=\{1,1,0\}$ presented above, in which an instance is classified as a class c with the probability $p(c|x)=\max(1,1,0)=1$, the analysis with equation (7) of contextual PDA (CPDA) is as follows:

$$r_1 = \frac{R_{\backslash 2}}{|R_{\backslash 2}|} + \frac{R_{\backslash 3}}{|R_{\backslash 3}|} = 0/2 + 1/2 = 0.5 \qquad (8)$$

$$r_2 = \frac{R_{\backslash 1}}{|R_{\backslash 1}|} + \frac{R_{\backslash 3}}{|R_{\backslash 3}|} = 0/2 + 1/2 = 0.5$$

$$r_3 = \frac{R_{\backslash 1}}{|R_{\backslash 1}|} + \frac{R_{\backslash 2}}{|R_{\backslash 2}|} = 0/2 + 0/2 = 1.$$

The features $x_1$ and $x_2$ make equal positive contributions to the decision. The last feature $x_3$ contributes nothing to the decision in this demonstration instance. The analysis result illustrates that CPDA can overcome the saturation problem. The reason behind this is that the relevance of each feature depends on inferences of all the contextual features instead of the feature (i.e. the omitted feature) itself.

In case that an input is high-dimensional, such as an input image, it is inefficient to consider the pixels as individual features. On the other hand, the individual pixels are not human-understandable visual features. Hence, it is proposed to take image patches as features.

The neural network-based classifiers often require a fixed input size, and the selected image patch should be resized to the required size. The shape of the image patch selected is squared which makes the computation of $f(x_i)$ possible. Hence, the image classifiers are assumed to be invariant to translation and scaling operation, which is satisfied in existing convolutional neural networks.

As not all pixels inside a patch are equally important, the resolution of the obtained saliency maps depends on the size of a single image patch. While too big patches lead to low-resolution saliency map, too small patches are not visually understandable as $f(x_i)$ is not meaningful. To avoid this dilemma, instead of splitting the image into separated patches, the patch is slid over the whole image with a fixed stride like in convolutional operations.

In the following, text and image classification decisions using different methods compared to the suggested method are explained.

Text classification with naive base classifiers

A text dataset 20 newsgroup as described in Lang, K. Newsweeder: *Learning to filter netnews. In Machine Learning Proceedings* 1995, pp. 331-339. Elsevier 1995. is taken, which is a collection of approximately 20,000 newsgroup documents, partitioned evenly across 20 different news topics. Each document is an email message including contents, a header, a signature block, and possible quotation blocks.

Most well-trained classifiers make decisions based on information in headers and footers. The sender and the receiver are affiliated with universities and institutes. The headers or the footers are informative enough to classify the document. The classifier makes decisions not based on words related to certain topics. To avoid that a classifier overfits to the irrelevant information, the header and the footer are removed from all documents in the dataset.

Given a class variable y and a dependent feature vector $\{x_1, x_2, \ldots, x_n\}$ and the assumption all the feature variables are independent, Bayes' theorem shows the relationship $$p(y \mid x_1, x_2, \ldots, x_n) = \frac{p(y) p(x_1, x_2, \ldots, x_n \mid y)}{p(x_1, x_2, \ldots, x_n)} = \frac{p(y) \prod_{t=1}^{n} p(x_i \mid y)}{p(x_1, x_2, \ldots, x_n)} \propto p(y) \prod_{i=1}^{n} p(x_i \mid y). \quad (9)$$

The individual instance is classified by $\hat{y} = \mathrm{argmax}_y p(y) \pi_{i=1}^{n} p(x_i \mid y)$.

One of the classic naive Bayes variants used in text classification is Multinomial Naive Bayes where the data are typically represented as word vector counts. tf-idf vectors are also known to work well in practice. tf-idf vectors of documents are taken as input features to estimate the parameters of the model. For each class, the model parameters are $\theta_y = \{\theta_{y1}, \theta_{y2}, \ldots, \theta_{yn}\}$. The parameter $\theta_{yi}$ is estimated by a smoothed version of maximum likelihood $$\hat{\theta}_{yi} = \frac{N_{yi} + \alpha}{N_y + \alpha * n}$$

where $N_{yi}$ is the number of times feature that appears in samples of class y in the training set, and $N_y$ is the total count of all features for the class. The smoothing factor $\alpha$ is empirically set as 0.01.

For an explanation of individual document classifications, the parameters of MultinomialNB classifiers are estimated with the training data set of the 20 newsgroup and achieves 70.09% accuracy of the test dataset. The parameter $\theta_{yi}$ specifies the sensitivity of classifier of class y to the feature $x_i$. For each classification, given the output class, the most sensitive words that appear in the document are chosen which is called sensitivity analysis (SA). The other model-agnostic methods LIME, PDA and the suggested CPDA are also applied to explain the individual document classifications.

The explanations of the classifications are shown in FIGS. 2a and 2b. Each column corresponds to the classification of a single document D1, . . . , D4. The first row R1 shows the part of the document text; the second row R2 shows the ground truth class GTC, the predicted class PC, the probability degree PD and the saturation degree SD (the extend of getting close to one). The explanations produced by the four methods are shown in the last row R3 respectively.

In the method of SA, the words with high sensitivity are top words since they would appear many times in a document. The relevant words identified by SA cannot explain the classification of documents. They are highlighted in bold italic. The identified relevant words cannot convince the user to trust the classification decisions. For each document, the method LIME generates 5000 distorted versions by removing some words, predicts probabilities for these distorted texts using the naive Bayesian classifier and trains a logistic regression with SGD (Stochastic Gradient Descent). SGD is a basic optimization method to train a neural network. The weights of the logistic regression are used to identify the words that make positive contributions to the classifier. As shown in FIGS. 2a and 2b, the produced explanations are more convincing.

In most classifications, especially the classifications with low saturation degree, e.g. document D1, both, PDA and CPDA, give similar good explanations, which successfully identify words related to the corresponding target class. In the classification with high saturation degree SD, PDA suffers from saturation of classification, where the biggest relevance value is close to zero, and the ones of most words are exactly zeros. CPDA produces better explanations without suffering saturation problems. For instance, in the classification of document D3, PDA identifies the word "in" as the most relevant word to the topic "sci.med". On the contrary, the word "yeast" in document D3 is identified by CPDA as the most relevant to the topic. CPDA produces reliable and stable explanations for individual classifications.

Image Classification with Deep Convolutional Neural Networks CNNs

In the following, individual image classifications of deep convolutional neural networks are explained. Pretrained vision models from pytorch framework as classifiers (AlexNet by default f( )) are taken, which requires a fixed input size 224×224. The input image x of size H×W is resized to the fixed input size, processed and classified f(x). The squared image patch k×k is clipped from the processed image of 224×224 and resized to the fixed input size again. The single image patch $x_i$ is classified as $f(x_i)$. It is assumed that the image classifier is invariant to image translation and scaling. When resizing an image patch, instead of resizing the clipped patch itself, the corresponding patch of the original image is resized to avoid unexpecting scaling effect, e.g., too blurry. Hence, $f(x_i)$ can describe the effect that the patch $x_i$ has on the prediction.

Is could be shown in empirically experiments that the method according to embodiments of the invention is better than LIME and PDA. In particular, the suggested method is more consistent and efficient.

The efficiency is a non-ignorable factor for model-agnostic saliency methods. Since they have no access to the parameters of classifiers, the algorithms have to make many times inferences to obtain enough information for identifying the relevance of input features. Additionally, the consistency of produced explanations is another important indicator to evaluate saliency methods. The consistent explanations make more sense to understand the classifier and gain more trust from end users.

For a single instance, LIME trains a local surrogate classifier to approximate the local classification boundary of the target classifier. Although the surrogate classifier takes the superpixels as individual features, LIME takes several minutes to produce an explanation for a classification. The explanations produced by LIME are inconsistent. The sources of inconsistency could be the modeling and the sampling process, the type of surrogate classifiers and the organization process of the surrogate classifiers.

PDA considers patches of an image as individual features to produce explanations. For each individual patch, PDA first models the conditional distribution $P(x_i|\hat{U}(x_i))$ and samples the patches from the distribution. The modeling and sampling processes are computationally expensive. Given an input image of size n×n and a patch of size k×k, $S(n-k+1)^2$ times forward passes are required to evaluate the relevance of all pixels, where S is the number of samples from the distribution $P(x_i|\hat{U}(x_i))$. Tens of minutes are required to produce an explanation.

Compared to LIME, CPDA requires neither the construction of noisy variant instances nor an extra classifier. Different from PDA, CPDA does not have to model the conditional distribution of image patches. Image patches are classified directly to identify the relevance of contextual pixels. With the same setting as in PDA, only $$\left(\frac{(n-k+1)}{s}\right)^2$$

times inferences are required to produce an explanation using CPDA, where k is the size of image patches and s is the stride. CPDA is $S*s^2$ times faster than PDA. It only takes seconds to minutes to produce an explanation when s=5. Table 2 lists the average time to produce a single explanation.

TABLE 2

Average time to produce a single explanation

| Model | LIME | PDA | CPDA |
| --- | --- | --- | --- |
| AlexNet $_{CPU}$ | 5.15 min | 380.82 min | 1.81 sec |
| AlexNet | 4.03 min | 20.71 min | 10.82 sec |
| VGG16 | 5.17 min | 86.62 min | 42.68 sec |
| Inception_V3 | 6.06 min | 184.67 min | 93.34 sec |
| ResNet | 4.46 min | 97.21 min | 49.10 sec |
| DenseNet | 3.36 min | 61.25 min | 30.39 sec |

The first row shows the time of running the method (LIME, PDA, CPDA) on AlexNet on a CPU while the other rows show the time on a single GPU (Tesla K80).

VGG16 outlined in table 2 has a similar architecture as AlexNet, but with more deeper layers. The deeper VGG16 identifies the most discriminative features to classify the image. Instead of wheels of a car shown in an original image to be assessed, for example, a sport-car image is classified based on the car roof, which can be used to distinguish it from cabs and busses. The most discriminative feature of a hot-air balloon image is a basket of the balloon for VGG16. Indian elephants differ from other species of elephants in their ears. Indian elephants have smaller ones than others. In explanations on VGG16, the corresponding discriminative visual features are highlighted. GoogleNet (also known as Inception_V3) convolves images and filters with multiple kernel size, where the features of different sizes can be identified as the class-discriminative features, e.g. a part of a balloon in an image. ResNet and DenseNet are equipped with skip connections where they learn features from a global view. Together with contexture information, the discriminative features are used to classify images. For instance, a sports car and the racetrack are extracted as relevant features for classification. Both the balloon and the basket are used to identify the image as a hot-air balloon.

FIG. 1 illustrates the steps of the method for computer-implemented analysis of a classification model as described above. In step S1, an effect of each feature on the prediction of the instance is identified by determining, for each feature, a relevance information representing a contextual information for all features of the instance omitting the considered feature. In step S2, the relevance value for each feature is determined by combining the relevance information for the features of the instance. In step S3, the plurality of relevance values is evaluated for the features of the instance to identify the effect of each feature on the prediction of the instance. Steps S1 to S3 are carried out by a processing unit PU which is adapted to perform the steps as described above.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-implemented analysis of a classification model
   which is adapted to map, as a prediction, a number of input instances, each of them having a number of features, into a number of probabilities of output classes, as a classification decision, according to a predetermined function; and
   which is adapted to determine a relevance value for each feature resulting in a saliency map;
   comprising the steps of:
   identifying an effect of each feature on the prediction of the instance by determining, for each feature, a relevance information representing a contextual information for all features of the instance omitting the considered feature;
   determining the relevance value for each feature by combining the relevance information for the features of the instance;
   evaluating the plurality of relevance values for the features of the instance to identify the effect of each feature on the prediction of the instance.

2. The method according to claim 1, wherein the relevance value for each feature is calculated by the sum of the ratios of the relevance information and the absolute value of the relevance information with feature being the omitted considered feature.

3. The method according to claim 1, wherein the relevance value for each feature is equal to or larger than 0.

4. The method according to claim 1, wherein the relevance information ($R_{\setminus i}$) is determined by calculating $$R_{\setminus i}=f(x)-\Sigma_{k=1}^{M}p(v_k|x_i)p(y|x_i,v_k)=f(x)-f(x_i),$$

with $v_k$ being the sampled values conditional on $x_i$, $x_i$ being feature i of the instance x, M being the number of samples or classes considered and y being an output class.

5. The method according to claim 1, wherein, when analyzing a classification model of high-dimensional images on deep neural networks, image patches instead of pixels are used as individual features.

6. The method according to claim 5, wherein the shape of the image patches is squared.

7. The method according to claim 5, wherein, instead of splitting the image into separated image patches, a patch is slid over the whole image with a fixed stride.

8. The method according to claim 1, wherein the classification model is a model-agnostic method.

9. A computer program product, comprising a computer readable hardware storage device having computer readable program code stored therein, said program code executable by a processor of a computer system to implement a method, directly loadable into the internal memory of a digital computer, comprising software code portions for performing the steps of claim 1 when the product is run on a computer.

10. A processing unit for computer-implemented analysis of a classification model which is adapted to map, as a prediction, a number of input instances, each of them having a number of features, into a number of probabilities of output classes, as a classification decision, according to a predetermined function; and which is adapted to determine a relevance value for each feature resulting in a saliency map;

the processing unit being configured to identify an effect of each feature on the prediction of the instance by determining, for each feature, a relevance information representing a contextual information for all features of the instance omitting the considered feature;

determine the relevance value for each feature by combining the relevance information for the features of the instance;

evaluate the plurality of relevance values for the features of the instance to identify the effect of each feature on the prediction of the instance.

11. The processing unit according to claim 10, which is further adapted to carry out the steps of identifying an effect of each feature on the prediction of the instance by determining, for each feature, a relevance information representing a contextual information for all features of the instance omitting the considered feature;

determining the relevance value for each feature by combining the relevance information for the features of the instance;

evaluating the plurality of relevance values for the features of the instance to identify the effect of each feature on the prediction of the instance, wherein the relevance value for each feature is calculated by the sum of the ratios of the relevance information and the absolute value of the relevance information with feature being the omitted considered feature.

* * * * *